(12) United States Patent
Singh et al.

(10) Patent No.: US 12,143,721 B2
(45) Date of Patent: Nov. 12, 2024

(54) METHOD AND ELECTRONIC DEVICE FOR GENERATING HYPER-STABILIZED VIDEO

(71) Applicant: SAMSUNG ELECTRONICS CO., LTD., Suwon-si (KR)

(72) Inventors: Ritesh Singh, Noida (IN); Kalgesh Singh, Noida (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/116,403

(22) Filed: Mar. 2, 2023

(65) Prior Publication Data

US 2023/0209190 A1    Jun. 29, 2023

Related U.S. Application Data

(63) Continuation of application No. PCT/KR2022/021368, filed on Dec. 27, 2022.

(30) Foreign Application Priority Data

Dec. 27, 2021  (IN) .............................. 202141060927

(51) Int. Cl.
    *H04N 23/68*   (2023.01)
    *H04N 23/60*   (2023.01)
    (Continued)

(52) U.S. Cl.
    CPC ....... *H04N 23/6812* (2023.01); *H04N 23/632* (2023.01); *H04N 23/64* (2023.01); *H04N 23/698* (2023.01)

(58) Field of Classification Search
    None
    See application file for complete search history.

(56) References Cited

U.S. PATENT DOCUMENTS 9,531,970 B2   12/2016   Haji-Khamneh et al.
9,686,471 B2    6/2017   Laroia et al.
                (Continued)

FOREIGN PATENT DOCUMENTS

JP    2019-041223 A    3/2019
JP    2021-190724 A   12/2021
WO   2021/000063 A1    1/2021

OTHER PUBLICATIONS

International Search Report and Written Opinion issued: Apr. 17, 2023 from the International Searching Authority in International Application No. PCT/KR2022/021368.
(Continued)

*Primary Examiner* — James M Hannett
(74) *Attorney, Agent, or Firm* — Sughrue Mion, PLLC

(57) ABSTRACT

A method for generating a hyper-stabilized video by an electronic device includes detecting, by the electronic device, a preview of at least one image frame on a screen of the electronic device, wherein the at least one image frame is captured by one or more cameras of the electronic device; determining, by the electronic device, an optimal Central Square Field of View (CSFoV) in the at least one image frame; determining, by the electronic device, a maximum rotation angle of the electronic device for each camera of the one or more cameras based on the optimal CSFoV; determining, by the electronic device, a current rotation angle of the electronic device by using at least one sensor of the electronic device; and generating, by the electronic device, the hyper-stabilized video based on the maximum rotation angle of the electronic device for the each camera and the current rotation angle of the electronic device.

15 Claims, 6 Drawing Sheets

(51) Int. Cl.
*H04N 23/63* (2023.01)
*H04N 23/698* (2023.01)

(56) References Cited

U.S. PATENT DOCUMENTS

| | | |
|---|---|---|
| 10,116,874 B2 | 10/2018 | Case, Jr. |
| 10,542,218 B2 | 1/2020 | Lee |
| 10,742,885 B1 * | 8/2020 | Kok .................. H04N 23/6842 |
| 2011/0050928 A1 | 3/2011 | Lee et al. |
| 2014/0232904 A1 | 8/2014 | Na et al. |
| 2018/0070015 A1 | 3/2018 | Hubel et al. |
| 2018/0103206 A1 | 4/2018 | Olson |
| 2020/0120252 A1 | 4/2020 | Douady et al. |
| 2021/0241434 A1 * | 8/2021 | Kim .......................... G06T 5/94 |
| 2021/0289164 A1 | 9/2021 | Derbanne et al. |
| 2021/0343033 A1 | 11/2021 | Bhat et al. |

OTHER PUBLICATIONS

Examination Report issued Mar. 19, 2024 by the Indian Patent Office for Indian Patent Application No. 202141060927.

* cited by examiner

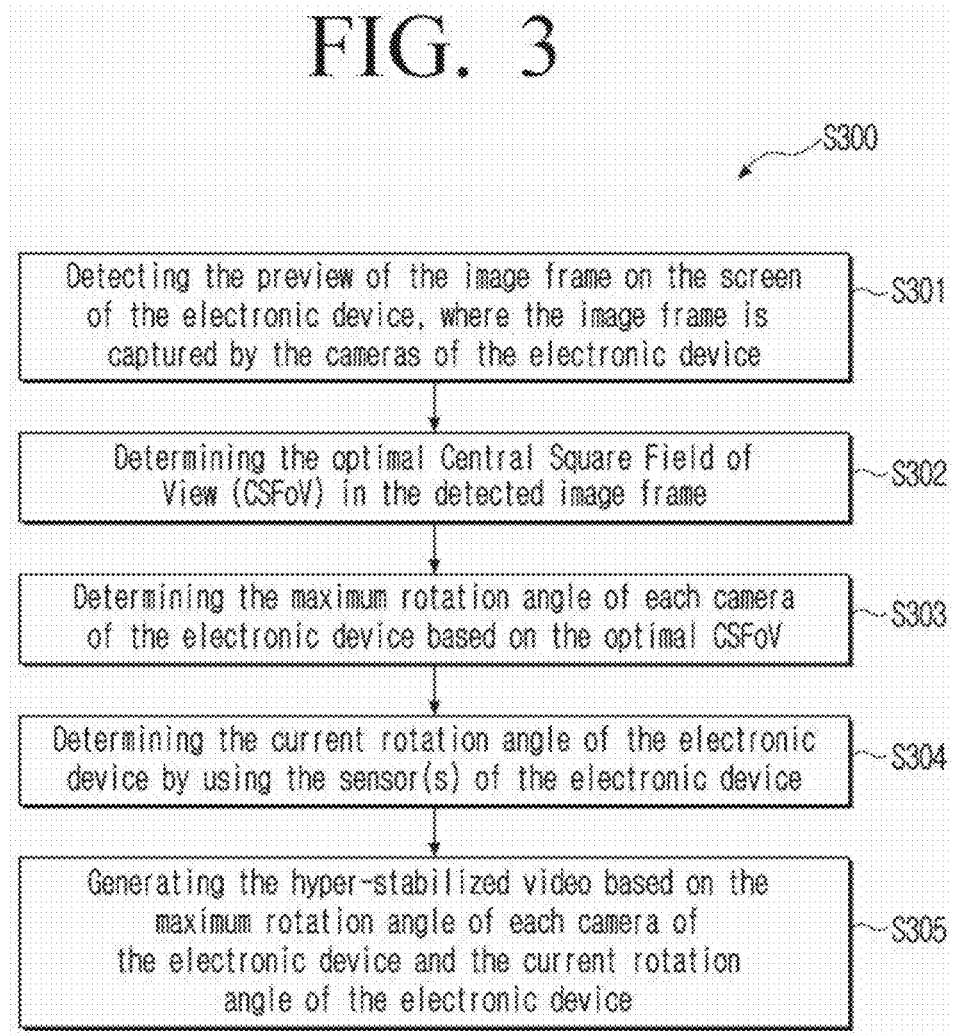

METHOD AND ELECTRONIC DEVICE FOR GENERATING HYPER-STABILIZED VIDEO

CROSS-REFERENCE TO RELATED APPLICATION(S)

This application is a bypass continuation of International Application No. PCT/KR2022/021368, filed on Dec. 27, 2022, which is based on and claims priority to Indian Patent Application No. 202141060927, filed on Dec. 27, 2021, in the Indian Intellectual Property Office, the disclosures of which are incorporated by reference herein in their entireties.

BACKGROUND

1. Field

The disclosure relates to an electronic device, and more specifically related to a method and the electronic device for generating a hyper-stabilized video.

2. Description of Related Art

In general, electronic devices such as video cameras, smartphones, tablets, personal digital assistants (PDAs), computers, and the like are capable of performing multiple functionalities such as capturing an image, capturing a video, etc. For example, a video may be captured under non-ideal conditions and with a non-ideal acquisition equipment. For example, while filming from a moving vehicle or during sporting activities, some videos may show a high degree of unwanted motion or jitter. Even videos acquired in ideal conditions may show a certain amount of unwanted shaking. Some inexpensive and ubiquitous video devices may not provide features for stabilizing image sequences to compensate for such jitter. As a result, there is a need for a method for video/image stabilization to capture the video/image without undesired motion or jitter/shake.

Some image stabilization methods (e.g., Optical Image Stabilization (OIS) and Sensor Shift Stabilization (SSS)) which may be used in, for example, a Digital Single-Lens Reflex (DSLR) camera (1) or a mirrorless camera may use motors and actuators to shift a lens and/or imaging sensor to counter camera motion and adjust for pitching and yawing wobble, but may not impact rolling shake. Furthermore, some image stabilization methods may only be capable of correcting tiny shaking angles, and may be primarily suited to image stabilization due to restricted maximum correction, and therefore may not be applicable for video stabilization.

Some video/image stabilization methods (e.g. Digital Image Stabilization (DIS)) may utilize an Artificial intelligence (AI) method to eliminate the undesired motion or jitter/shake. Furthermore, some video/image stabilization methods may have limitations such as low precision, long processing time, correcting only small shake angles, relying on assumption that camera shake results in a convolution of an existing frame(s), and generating a stabilized video/image using a blur reduction method that degrades video/image quality. In embodiments, the expression "frame(s)" may mean, for example, one or more frames, or at least one frame.

Some video/image stabilization methods (e.g. Platform Hyper-stabilization or Mechanical Image Hyper-stabilization (MIS), Optical Image Stabilization (OIS), and Sensor Shift Stabilization (SSS)), which may correspond to system (2) and system (3), may use a system of motors and actuators to counter the camera shake, which may be either too expensive for an average user, or not easily applicable to everyday life/scenarios. These systems may also be prone to aging and failure because they include moving parts that have friction in between them.

Some video/image stabilization methods (e.g. Super Steady Mode (SSM)), may require a user of the electronic device (10) to manually select the SSM mode to capture the video/image without the undesired motion or the jitter/shake, as shown in user interface screens (4), user interface screen (5), and user interface screen (6). Furthermore, the existing image stabilization methods use a central rectangular field of view of a wide-angle camera of the electronic device (10). As a result, everything beyond the central rectangular field of view that was captured may waste sensor area, resulting in low resolution and poor low-light performance.

Thus, there is a need for a useful alternative for generating hyper-stabilized content (e.g. video, image, etc.) by an electronic device.

SUMMARY

Provided are a method, system, and device for generating a hyper-stabilized content (e.g. video, image, etc.) with an optimal resolution (e.g. High Definition (HD), Full-HD, etc.) for an optimal Central Square Field of View (CSFoV) by automatically switching between multiple camera sensors of an electronic device based on a maximum rotation angle of each camera sensor and a current rotation angle of the electronic device. Furthermore, the device determines the optimal CSFoV based on a field width of each camera sensor and/or a user input and/or a history of the user input. Furthermore, the electronic device determines the maximum rotation angle based on the optimal CSFoV of an image frame(s) displayed on a screen of the electronic device. Furthermore, the electronic device determines the current rotation angle of the electronic device by using a sensor(s) (e.g. a gyroscope, an accelerometer, etc.) of the electronic device. As a result, the generated content includes optimal resolution for each orientation (i.e. pitching, yawing, and rolling) of the electronic device and hyper-stabilized optimal CSFoV without requiring any additional hardware, which enhances the content quality and user experience. In embodiments, the expression "sensor(s)" may mean one or more sensors, or at least one sensor.

Additional aspects will be set forth in part in the description which follows and, in part, will be apparent from the description, or may be learned by practice of the presented embodiments.

In accordance with an aspect of the disclosure, a method for generating a hyper-stabilized video by an electronic device includes detecting, by the electronic device, a preview of at least one image frame on a screen of the electronic device, wherein the at least one image frame is captured by one or more cameras of the electronic device; determining, by the electronic device, an optimal Central Square Field of View (CSFoV) in the at least one image frame; determining, by the electronic device, a maximum rotation angle of the electronic device for each camera of the one or more cameras based on the optimal CSFoV; determining, by the electronic device, a current rotation angle of the electronic device by using at least one sensor of the electronic device; and generating, by the electronic device, the hyper-stabilized video based on the maximum rotation angle of the electronic device for the each camera and the current rotation angle of the electronic device.

The generating of the hyper-stabilized video based on the maximum rotation angle of the electronic device for the each camera and the current rotation angle of the electronic device may further include: capturing, by the electronic device, the at least one image frame using a first camera of the one or more cameras; automatically switching, by the electronic device, between the first camera and at least one second camera or among the at least one second camera based on the maximum rotation angle of the electronic device for the each camera and the current rotation angle in order to continue capturing the at least one image frame; and generating, by the electronic device, the hyper-stabilized video with an optimal resolution, wherein the hyper-stabilized video may further include the at least one image frame captured by the first camera and the at least one second camera.

The determining of the optimal CSFoV in the at least one image frame may further include: receiving, by the electronic device, a plurality of camera sensor parameters from the each camera, wherein the plurality of camera sensor parameters may further include a horizontal size, a vertical size, a focal length, a horizontal Field of View (FoV), and a vertical FoV; determining, by the electronic device, a FoV of the each camera based on the plurality of camera sensor parameters; determining, by the electronic device, a field width of the each camera, wherein the field width may further include a minimum dimension of the FoV; sorting, by the electronic device, the field width from a lowest value to a highest value; storing, by the electronic device, the sorted field width in an array; and selecting, by the electronic device, the optimal CSFoV in the at least one detected image frame, wherein the optimal CSFoV may further include the field width having the highest value from among all of the one or more cameras.

The optimal CSFoV of the electronic device may be determined based on at least one of a highest field width among all of the one or more cameras, a user input, and a history of the user input.

The determining of the maximum rotation angle of the electronic device for the each camera based on the optimal CSFoV may further include: determining, by the electronic device, the maximum rotation angle of the electronic device for the each camera based on the optimal CSFoV and a field width of the each camera; sorting, by the electronic device, the determined maximum rotation angle from a lowest value to a highest value; and storing, by the electronic device, the sorted maximum rotation angle in an array.

The at least one sensor of the electronic device may further include at least one from among a gyroscope, an accelerometer, a tilt detector, a step detector, and a magnetometer.

The current rotation angle may be used to select an optimal camera by using the at least one sensor to correct a frame rotation and extract the optimal CSFoV from the at least one image frame, and the optimal camera may further include at least one of a first camera and the at least one second camera.

The capturing of the at least one image frame using the first camera of the electronic device may further include: selecting, by the electronic device, the first camera, wherein the first camera may further include a lowest field width among all of the one or more cameras which is greater than the optimal CSFoV; and capturing, by the electronic device, the at least one image frame using the first camera of the electronic device.

The automatically switching between the first camera and the at least one second camera or among the at least one second camera based on the maximum rotation angle of the electronic device for the each camera and the current rotation angle may further include: determining, by the electronic device, whether the current rotation angle exceeds the maximum rotation angle; switching to an optimal camera, wherein the optimal camera may further include a next larger field width corresponding to a next larger maximum rotation angle based on determining that the current rotation angle exceeds the maximum rotation angle, and wherein the optimal camera may further include a next smaller field width corresponding to a next smaller maximum rotation angle based on determining that the current rotation angle does not exceed the maximum rotation angle; and capturing, by the electronic device, the at least one image frame using the optimal camera, wherein the optimal camera may further include at least one of the first camera and the at least one second camera.

The method may further include a smooth switching between a first camera and at least one second camera or among the at least one second camera.

The smooth switching may further include: determining, by the electronic device, a buffer angle around the maximum rotation angle of the each camera; automatically switching on, by the electronic device, the at least one second camera based on the current rotation angle of the electronic device being greater than a difference between the maximum rotation angle and the buffer angle of the first camera; simultaneously switching on, by the electronic device, the first camera and the at least one second camera when the current rotation angle of the electronic device being lesser than a sum of the maximum rotation angle and the buffer angle of the first camera; and automatically switching off, by the electronic device, the first camera based on the current rotation angle of the electronic device being greater than the sum of the maximum rotation angle and the buffer angle of the first camera.

In accordance with an aspect of the disclosure, an electronic device for generating a hyper-stabilized video, the electronic device includes a memory; at least one processor processor; a camera; and a hyper-stabilization engine, operably connected to the memory and the processor, and configured to: detect a preview of at least one image frame on a screen of the electronic device, wherein the at least one image frame is captured by one or more cameras of the electronic device; determine an optimal Central Square Field of View (CSFoV) in the at least one detected image frame; determine a maximum rotation angle of the electronic device for each camera of the one or more cameras based on the optimal CSFoV; determine a current rotation angle of the electronic device by using at least one sensor of the electronic device; and generate the hyper-stabilized video based on the maximum rotation angle of the electronic device for the each camera and the current rotation angle of the electronic device.

To generate the hyper-stabilized video based on the maximum rotation angle of the electronic device for each camera and the current rotation angle of the electronic device the hyper-stabilization engine may be further configured to: capture the at least one image frame using a first camera of the one or more cameras; automatically switch between the first camera and at least one second camera or among the at least one second camera based on the maximum rotation angle and the current rotation angle in order to continue capturing the at least one image frame; and generate the hyper-stabilized video with an optimal resolution, wherein hyper-stabilized video may further include the at least one image frame captured by the first camera and the at least one second camera.

To determine the optimal CSFoV in the at least one detected image frame, the hyper-stabilization engine may be further configured to: receive a plurality of camera sensor parameters from the each camera, wherein the plurality of camera sensor parameters may further include a horizontal size, a vertical size, a focal length, a horizontal Field of View (FoV), and a vertical FoV; determine a FoV of the each camera based on the received plurality of camera sensor parameters; determine a field width of each camera, wherein the field width may further include a minimum dimension of the FoV; sort the field width from a lowest value to a highest value; store the sorted field width in an array; and select the optimal CSFoV in the at least one detected image frame, wherein the optimal CSFoV may further include the field width having the highest value from among all of the one or more cameras.

The optimal CSFoV of the electronic device may be determined based on at least one of a highest field width among all of the one or more cameras, a user input, and a history of the user input.

These and other aspects of the embodiments herein will be better appreciated and understood when considered in conjunction with the following description and the accompanying drawings. It should be understood, however, that the following descriptions, while indicating various embodiments and numerous specific details thereof, are given by way of illustration and not of limitation. Many changes and modifications may be made within the scope of the embodiments herein, and the embodiments herein include all such modifications.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 3 is a flow diagram illustrating a method for generating the hyper-stabilized content, according to an embodiment;

DETAILED DESCRIPTION

Figure 1:
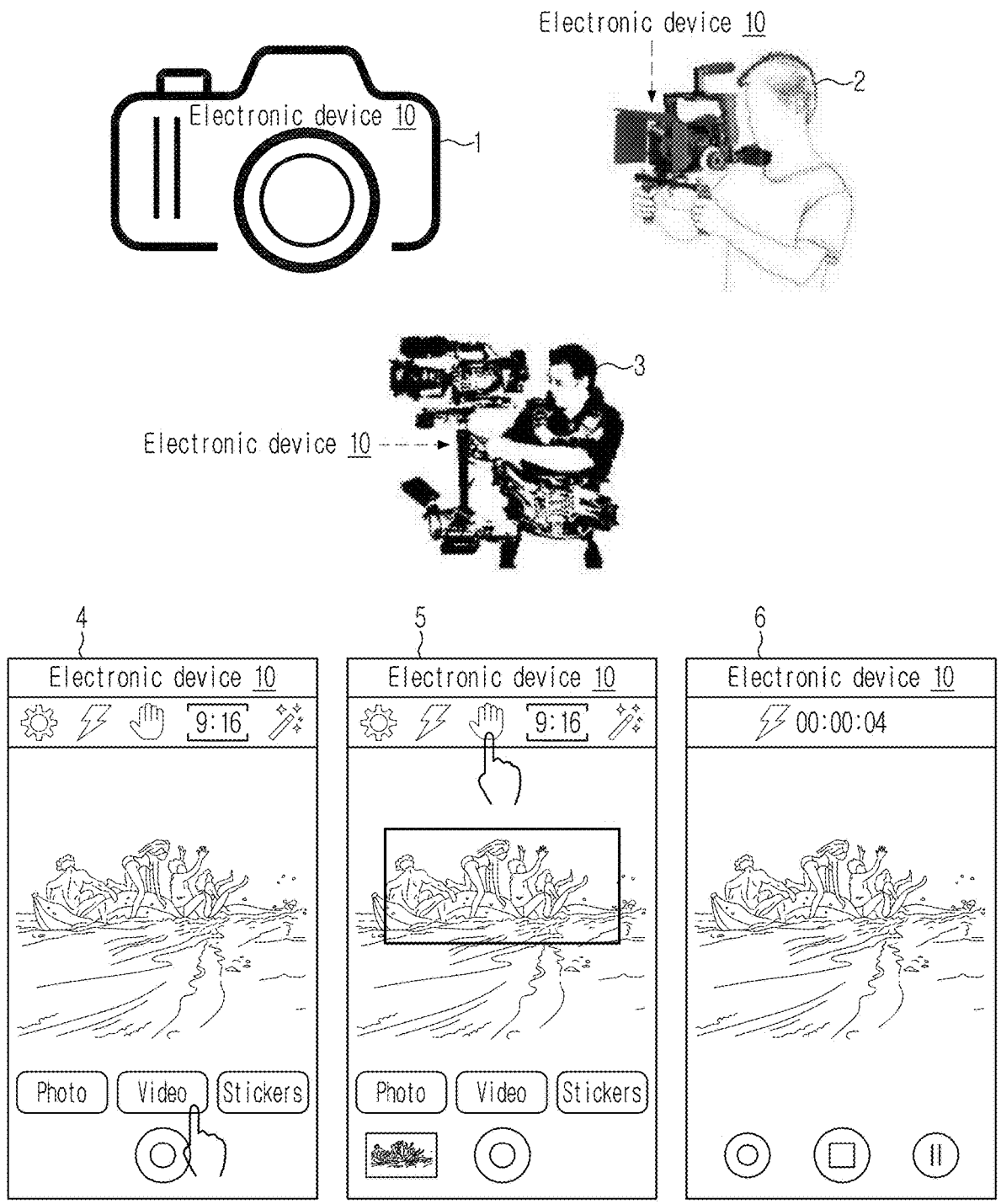
FIG. 1 illustrates problems in stabilized video/image generation methods.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure embodiments herein. Also, the various embodiments described herein are not mutually exclusive, as embodiments can be combined with one or more other embodiments to form new embodiments. The term "or" as used herein, refers to a non-exclusive or, unless otherwise indicated. The examples used herein are intended merely to facilitate an understanding of ways in which embodiments herein can be practiced and to further enable those skilled in the art to practice embodiments herein. Accordingly, the examples should not be construed as limiting the scope of embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and in embodiments may be driven by firmware. The circuits may, for example, be embodied in one or more semiconductor chips, or on substrate supports such as printed circuit boards and the like. The circuits included in a block may be implemented by dedicated hardware, or by a processor (e.g., one or more programmed microprocessors and associated circuitry), or by a combination of dedicated hardware to perform some functions of the block and a processor to perform other functions of the block. Each block of embodiments may be physically separated into two or more interacting and discrete blocks without departing from the scope of the disclosure. Likewise, the blocks of embodiments may be physically combined into more complex blocks without departing from the scope of the disclosure The accompanying drawings are used to help easily understand various technical features, and it should be understood that embodiments presented herein are not limited by the accompanying drawings. As such, the present disclosure should be construed to extend to any alterations, equivalents, and substitutes in addition to those which are particularly set out in the accompanying drawings. Although the terms first, second, etc. may be used herein to describe various elements, these elements should not be limited by these terms. These terms are generally only used to distinguish one element from another.

Throughout this disclosure, the terms "camera" and "camera sensor" may be used interchangeably and may mean the same. Throughout this disclosure, the terms "camera-1" and "first camera sensor" may be used interchangeably and may mean the same. Throughout this disclosure, the terms "camera-2" and "second camera sensor" may be used interchangeably and may mean the same.

Accordingly, embodiments herein relate to a method for generating a hyper-stabilized video by an electronic device. The method includes detecting, by the electronic device, a preview of an image frame(s) on a screen of the electronic device, where the image frame(s) is captured by a camera sensor(s) of the electronic device. Further, the method includes determining, by the electronic device, an optimal Central Square Field of View (CSFoV) in the detected image frame(s). Further, the method includes determining, by the electronic device, a maximum rotation angle of the electronic device for each camera sensor based on the optimal CSFoV. Further, the method includes determining, by the electronic device, a current rotation angle of the electronic device by using a sensor(s) of the electronic device. Further, the method includes generating, by the electronic device, the hyper-stabilized video based on the maximum rotation angle of the electronic device for each camera sensor and the current rotation angle of the electronic device.

Accordingly, embodiments herein provide the electronic device for generating the hyper-stabilized video. The electronic device includes a hyper-stabilization engine coupled with a processor and a memory. The hyper-stabilization engine is configured to detect the preview of the image frame(s) on the screen of the electronic device, where the image frame(s) is captured by the camera sensor(s) of the electronic device. Further, the hyper-stabilization engine is configured to determine the optimal CSFoV in the detected image frame(s). Further, the hyper-stabilization engine is configured to determine the maximum rotation angle of the electronic device for each camera sensor based on the optimal CSFoV. Further, the hyper-stabilization engine is configured to determine the current rotation angle of the electronic device by using the sensor(s) of the electronic device. Further, the hyper-stabilization engine is configured to generate the hyper-stabilized video based on the maximum rotation angle of the electronic device for each camera sensor and the current rotation angle of the electronic device.

Embodiments may allow the electronic device to generate a hyper-stabilized content (e.g. video, image, etc.) with an optimal resolution (e.g. High Definition (HD), Full-HD, etc.) for the optimal CSFoV by automatically switching between multiple camera sensors of an electronic device based on the maximum rotation angle of each camera sensor and the current rotation angle of the electronic device. Furthermore, the electronic device determines the optimal CSFoV based on a field width of each camera sensor and/or a user input and/or a history of the user input. Furthermore, the electronic device determines the maximum rotation angle based on the optimal CSFoV of an image frame(s) displayed on the screen of the electronic device. Furthermore, the electronic device determines the current rotation angle of the electronic device by using the sensor(s) (e.g. a gyroscope, an accelerometer, etc.) of the electronic device. As a result, the generated content includes optimal resolution for each orientation (i.e. pitching, yawing, and rolling) of the electronic device and hyper-stabilized optimal CSFoV without requiring any additional hardware, which enhances the content quality and user experience.

Referring now to the drawings, and more particularly to FIGS. 2 through 5, where similar reference characters denote corresponding features consistently throughout the figures, there are shown various embodiments.

Figure 2:
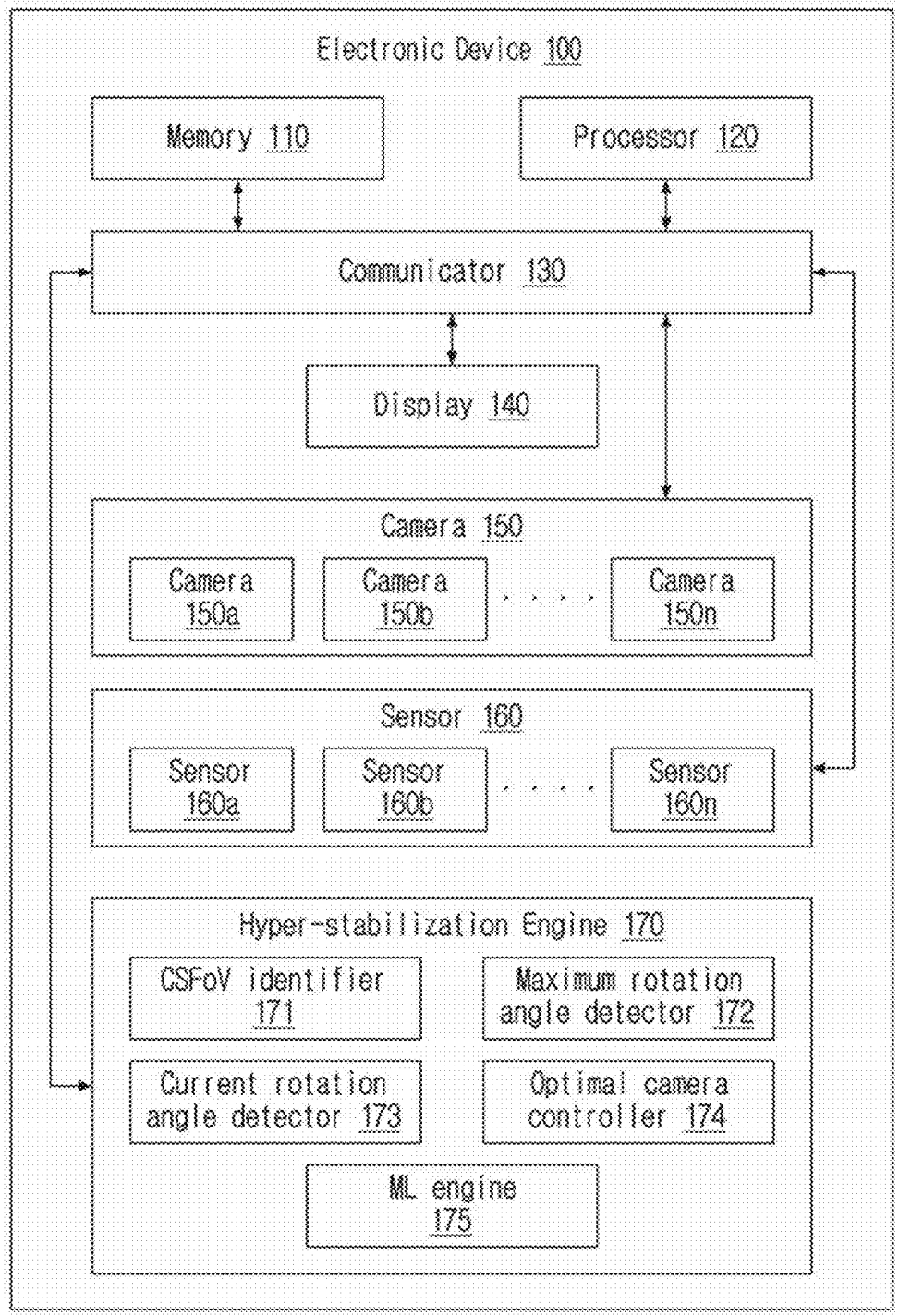
FIG. 2 is a block diagram illustrating an electronic device for generating a hyper-stabilized content, according to an embodiment.

FIG. 2 illustrates a block diagram of an electronic device (100) for generating a hyper-stabilized content, according to an embodiment as disclosed herein. Examples of the electronic device (100) include, but are not limited to a smartphone, a tablet computer, a Personal Digital Assistance (PDA), an Internet of Things (IoT) device, a wearable device, etc.

In an embodiment, the electronic device (100) includes a memory (110), a processor (120), a communicator (130), a display (140), a camera (150) (e.g. Charge-Coupled Device (CCD), Electron-Multiplying Charge-Coupled Device (EMCCD), Complementary Metal-Oxide-Semiconductor (CMOS), etc.), a sensor (160) (e.g. a gyroscope, an accelerometer, a tilt detector, a step detector, a magnetometer, etc.) and a hyper-stabilization engine (170).

In an embodiment, the memory (110) stores an optimal Central Square Field of View (CSFoV), a maximum rotation angle of each camera (150), a current rotation angle of the electronic device (100), a plurality of camera sensor parameters, a FoV of each camera sensor (150), a field width of each camera (150), an array of sorted field width, an array of sorted maximum rotation angle, a user input, and a history of the user input. The memory (110) stores instructions to be executed by the processor (120). The memory (110) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (110) may, in some examples, be considered a non-transitory storage medium. The term "non-transitory" may indicate that the storage medium is not embodied in a carrier wave or a propagated signal. However, the term "non-transitory" should not be interpreted that the memory (110) is non-movable. In certain examples, a non-transitory storage medium may store data that can, over time, change (e.g., in Random Access Memory (RAM) or cache). The memory (110) can be an internal storage unit or it can be an external storage unit of the electronic device (100), a cloud storage, or any other type of external storage.

The processor (120) communicates with the memory (110), the communicator (130), the display (140), the camera (150), the sensor (160), and the hyper-stabilization engine (170). The processor (120) is configured to execute instructions stored in the memory (110) and to perform various processes. The processor (120) may include one or a plurality of processors, maybe a general-purpose processor, such as a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU).

The communicator (130) is configured for communicating internally between internal hardware components and with external devices (e.g. server, etc.) via one or more networks (e.g. radio technology). The communicator (130) may include an electronic circuit which enables wired or wireless communication, for example according to a particular communication standard.

The hyper-stabilization engine (170) is implemented by processing circuitry such as logic gates, integrated circuits, microprocessors, microcontrollers, memory circuits, passive electronic components, active electronic components, optical components, hardwired circuits, or the like, and in embodiments may be driven by firmware. The circuits may, for example, be embodied in one or more semiconductor chips, or on substrate supports such as printed circuit boards and the like.

In an embodiment, the hyper-stabilization engine (170) includes a CSFoV identifier (171), a maximum rotation angle detector (172), a current rotation angle detector (173), an optimal camera controller (174), and a Machine Learning (ML) engine (175).

The CSFoV identifier (171) detects a preview of an image frame(s) on the screen (i.e. display (140)) of the electronic device (100), where the image frame(s) is captured by the camera (150) of the electronic device (100). Furthermore, the CSFoV identifier (171) receives the plurality of camera sensor parameters from each camera (150), where the plurality of camera sensor parameters may include a horizontal size, a vertical size, a focal length, a horizontal Field of View (FoV), and a vertical FoV. Furthermore, the CSFoV identifier (171) determines the FoV of each camera sensor (150) based on the received plurality of camera sensor parameters.

The CSFoV identifier (171) may determine the FoV ($A_{h,i} \times A_{v,i}$) for each camera sensor (150) Equation 1 and Equation 2 below:

$$A_{h,i} = 2\tan^{-1}\frac{D_{h,i}}{2F_i} \qquad \text{(Eq. 1)}$$

$$A_{v,i} = 2\tan^{-1}\frac{D_{v,i}}{2F_i} \qquad \text{(Eq. 2)}$$

In Equation (1) and Equation (2),
$D_{h,i}$: Horizontal size an image sensor of an $i^{th}$ camera (150)
$D_{v,i}$: Vertical size of an image sensor of the $i^{th}$ camera (150)
$F_i$: Focal length of a camera lens of the $i^{th}$ camera sensor (150)
$A_{h,i}$: Horizontal field of view of the $i^{th}$ camera in radians
$A_{v,i}$: Vertical field of view of the $i^{th}$ camera in radians Furthermore, the CSFoV identifier (171) determines the field width of each camera (150), where the field width includes a minimum dimension of the FoV. Furthermore, the CSFoV identifier (171) sorts the determined field width from lowest value to highest value. Furthermore, the CSFoV identifier (171) stores the sorted field width in an array (A) (or for example the memory (110).) The CSFoV identifier (171) may determine the field width ($a_i$) for each camera (150) is given by using Equation 3 below:

$$a_i = \min(A_{h,i}, A_{v,i}) \qquad \text{(Eq. 3)}$$

Furthermore, the CSFoV identifier (171) selects the optimal CSFoV ($s_i \times s_i$) in the detected image frame, where the optimal CSFoV comprises the highest field width ($s_m \times s_m$) among all cameras (150). The CSFoV identifier (171) determines the CSFoV ($s_i \times s_i$) and ($s_m \times s_m$) for each camera (150) is given by Equation 4 and Equation 5 below:

$$s_i = \frac{a_i}{\sqrt{2}} \qquad \text{(Eq. 4)}$$

$$s_m = \frac{\text{Max}(a_i)}{\sqrt{2}} \qquad \text{(Eq. 5)}$$

In an embodiment, the CSFoV identifier (171) selects based on a highest field width among all cameras (150) and/or the user input, and/or the history of the user input using the ML engine (175).

The maximum rotation angle detector (172) determines the maximum rotation angle ($t_i$) of each camera (150) of the electronic device (100) based on the optimal CSFoV and the field width. The maximum rotation angle detector (172) determines the maximum rotation angle ($t_i$) for each camera (150) is given by Equation 6 below:

$$t_i = \sin^{-1}\frac{a_i - \sqrt{2s_m^2 - a_i^2}}{2s_m} \qquad \text{(Eq. 6)}$$

Furthermore, the maximum rotation angle detector (172) sorts the determined maximum rotation angle from lowest value to highest value. Furthermore, the maximum rotation angle detector (172) stores the sorted maximum rotation angle in an array (7) (or for example the memory (110)).

The current rotation angle detector (173) selects an optimal camera (150) by using the sensor (160) to correct a frame rotation and extract the optimal CSFoV from the image frame(s), where the optimal camera (150) includes the first camera (150a) and/or the second camera (150b-150n). Example of the sensor (160) includes, but are not limited to, a gyroscope, an accelerometer, a tilt detector, a step detector, and a magnetometer.

The optimal camera controller (174) selects the first camera sensor (150a), whereas the first camera sensor (150a) includes lowest field width among all cameras (150) and is greater than optimal CSFoV (as discussed below in an example scenario corresponding to FIGS. 4A-4B). Furthermore, the optimal camera controller (174) captures (or for example starts recording) the image frame(s) using the first camera sensor (150a) of the electronic device (100). Furthermore, the optimal camera controller (174) automatically switches between the first camera sensor (150a) and the second camera sensor (150b-150n) or among multiple second cameras (150b-150n) based on the maximum rotation angle ($t_i$) and the current rotation angle in order to continue capturing the image frame(s).

Furthermore, the optimal camera controller (174) determines whether the current rotation angle exceeds the maximum rotation angle ($t_i$). Furthermore, the optimal camera controller (174) switches to the optimal camera (150), where the optimal camera (150) comprises a next larger field width corresponding to a next larger maximum rotation angle ($t_i$) in response to determining that the current rotation angle exceeds the maximum rotation angle. Furthermore, the optimal camera controller (174) switches to the optimal camera (150), where the optimal camera (150) comprises a next smaller field width corresponding to a next smaller maximum rotation angle ($t_i$) in response to determining that the current rotation angle does not exceed the maximum rotation angle. Furthermore, the optimal camera controller (174) performs smooth switching between the first camera sensor (150a) and the second camera sensor (150b-150n).

Furthermore, the optimal camera controller (174) determines a camera shake of the current rotation angle, chooses the camera (150) with the smallest maximum rotation angle ($t_i$) such that $t_i - \Delta > c$ (where $\Delta$ refers to a buffer to ensure smooth switching of the camera (150)) to record the video/image. Furthermore, the optimal camera controller (174) activates and/or deactivates the camera (150) based on the maximum rotation angle ($t_i$) and the current rotation angle in order to continue capturing the image frame(s). Furthermore, the optimal camera controller (174) corrects each frame based on the current rotation angle and extracts the upright CSFoV from all corrected frames in real-time. Furthermore, the optimal camera controller (174) then displays the corrected frame on the display (140) of the electronic device (100), which may be or may include a screen, and stores it in the memory (110).

For example, When the current rotation angle exceeds the maximum rotation angle $t_i - \Delta_{inc}$ for the current camera (where $\Delta_{inc}$ is the buffer angle to activate the next camera before deactivating the current camera), the camera is switched to the camera with the next larger field width ($a_{i+1}$) corresponding to the next larger maximum rotation angle ($t_{i+1}$). When the current rotation angle reduces to less than the maximum rotation angle $t_i - \Delta_{dec}$ for the current camera (where $\Delta_{dec}$ is the buffer angle to activate the next camera before deactivating the current camera, the camera is switched back to the next smaller field width ($a_{i-1}$) corresponding to the next smaller maximum rotation angle ($t_{i-1}$).

In other words, for the camera shake of current rotation angle, the camera with the smallest $t_i$ such that $t_i + \Delta_{inc/dec} > c$ is used to record the video/image. This may ensure optimum resolution for the hyper-stabilized video with the field of view, $s_m \times s_m$. In general, $\Delta_{dec} > \Delta_{inc}$, which may mean that the buffer while selecting a camera with a larger field of view is smaller than the buffer while selecting a camera with a smaller field of view. For example, the angle at which switch down happens may be smaller than the angle at which switch up happens, so that the camera with the larger field of view may be retained for a little longer while switching down. This may ensure that the cameras are not rapidly switched if the current rotation angle hovers around the maximum rotation angle for the current camera.

When the next camera choice is determined, the electronic device 100 may activate the selected next camera and begin recording. When the Multiple Camera System activates the next camera and its image/video frames start being received by the optimal camera controller (174) (smooth switch), the optimal camera controller (174) converts the next camera pipeline into the current camera pipeline. The next camera pipeline is completely activated before the current camera pipeline is stopped. This may be done so that a hardware response delay does not result in interruption of the recorded video or image preview.

The ML engine (175) may be implemented through an Artificial Intelligence (AI) model. A function associated with AI may be performed through non-volatile memory and/or volatile memory which may be included for example in the memory (110), and the processor (120). One or a plurality of processors control the processing of the input data (e.g. image frame) in accordance with a predefined operating rule or AI model stored in the non-volatile memory and the volatile memory. The predefined operating rule or artificial intelligence model may be provided through training or learning (e.g. a user input, a history of the user input, etc.). Here, being provided through learning may mean that, by applying a learning mechanism to a plurality of learning data, a predefined operating rule or AI model of a desired characteristic is made. The learning may be performed in a device itself in which AI according to an embodiment is performed, and/o may be implemented through a separate server/system. The AI model may include a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks. The learning mechanism is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

Although FIG. 2 shows various hardware components of the electronic device (100), other embodiments are not limited thereto. For example, other embodiments may include less or more number of components. Further, the labels or names of the components are used only for illustrative purpose and does not limit the scope of the disclosure. One or more components can be combined to perform the same or substantially similar function to generate the hyper-stabilized video/image/content.

FIG. 3 is a flow diagram (S300) illustrating a method for generating the hyper-stabilized content, according to an embodiment as disclosed herein. The operation (S301-S305) may be performed by the electronic device (100).

At operation S301, the method includes detecting the preview of the image frame on the display (140) of the electronic device (100), where the image frame is captured by the cameras (150) of the electronic device (100). At operation S302, the method includes determining the optimal CSFoV in the detected image frame. At operation S303, the method includes determining the maximum rotation angle ($t_i$) of each camera (150) of the electronic device (100) based on the optimal CSFoV. At operation S304, the method includes determining the current rotation angle of the electronic device (100) by using the sensor(s) (160) of the electronic device (100). At operation S305, the method includes generating the hyper-stabilized video based on the maximum rotation angle ($t_i$) of each camera (150) of the electronic device (100) and the current rotation angle of the electronic device (100).

The various actions, acts, blocks, steps, or the like in the flow diagram (S300) may be performed in the order presented, in a different order, or simultaneously. Further, in some embodiments, some of the actions, acts, blocks, steps, or the like may be omitted, added, modified, skipped, or the like without departing from the scope of the disclosure.

Figure 4A:
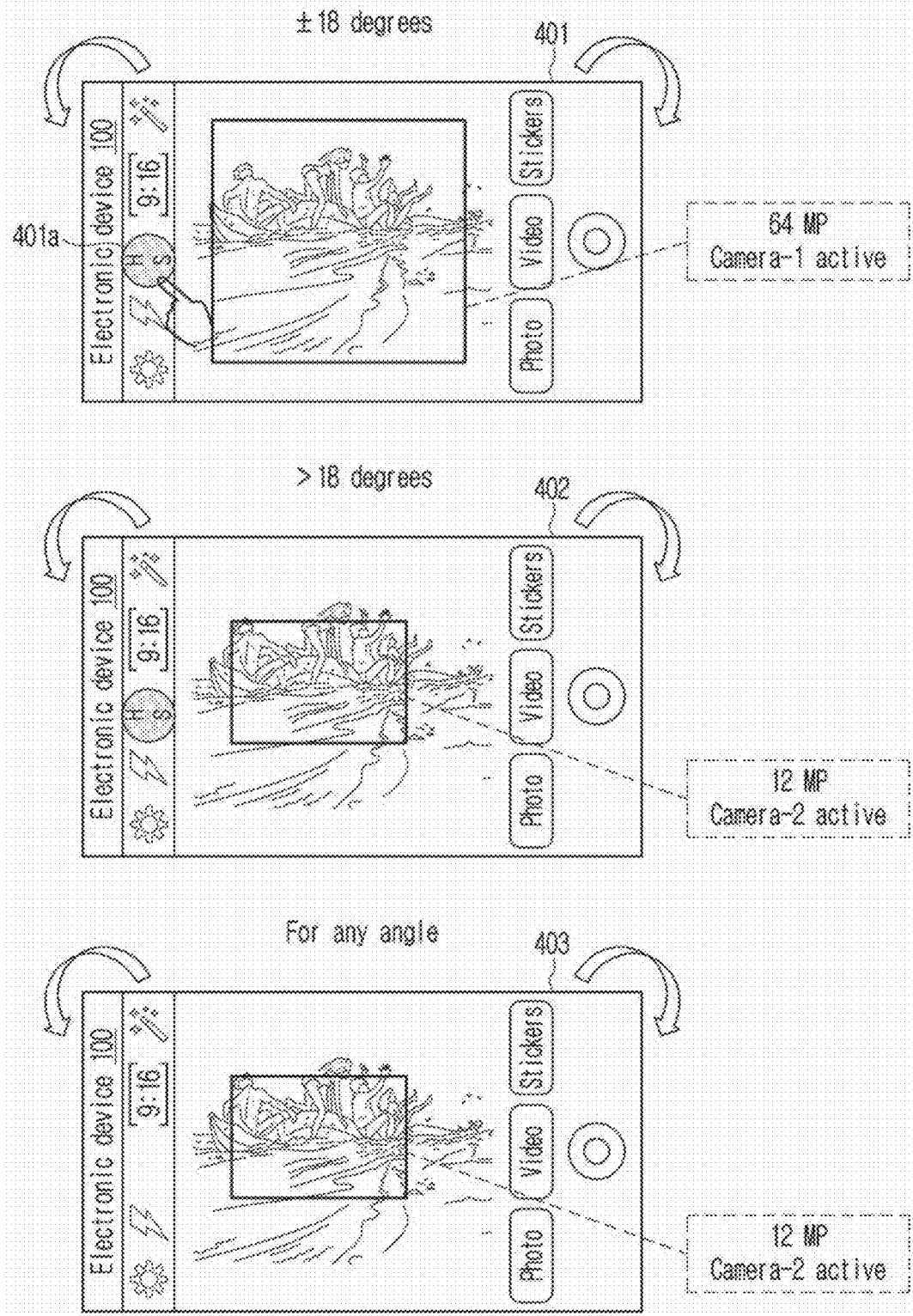
FIGS. 4A and 4B are diagrams illustrating example scenarios for automatic switching between a first camera sensor and a second camera sensor based on a maximum rotation angle and a current rotation angle in order to continue capturing an image frame(s), according to an embodiment.
Figure 4B:
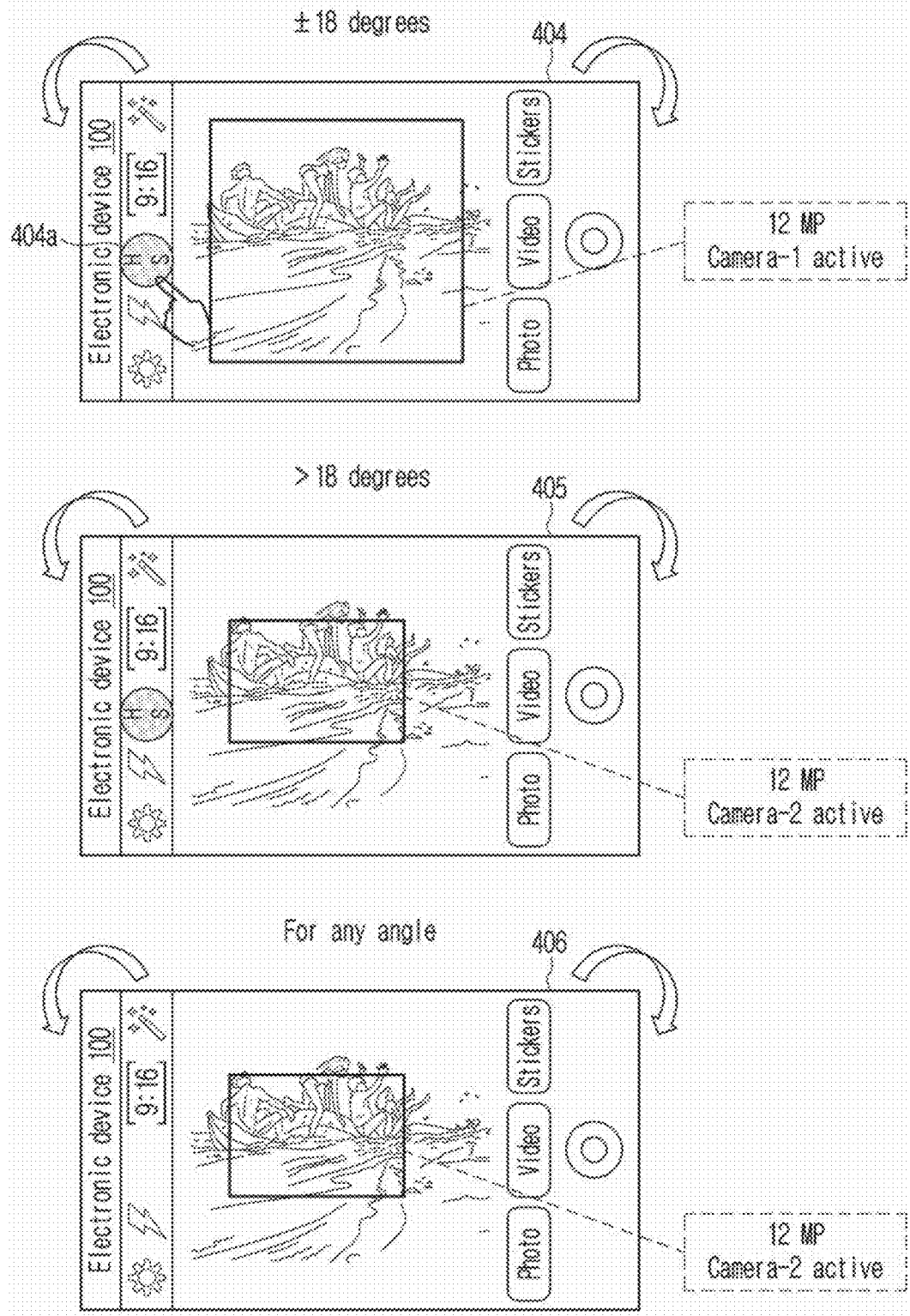

FIGS. 4A-4B illustrate example scenarios for automatic switching between the first camera (150a) and the second camera (150b) based on the maximum rotation angle ($t_i$) and the current rotation angle in order to continue capturing the image frame(s), according to an embodiment as disclosed herein.

As shown in user interface screen 401 and user interface screen 402, consider an example scenario where the user of the electronic device (100) wants to capture the hyper-stabilized video by selecting a hyper-stabilized mode (401a) of the electronic device (100) and utilizing a current camera configuration (e.g. dual camera) of the electronic device (100). The electronic device (100) has a dual camera with the first camera sensor (150a) being a 64 Megapixel (MP) telephoto camera and the second camera sensor (150b) being a 12 MP ultra-wide camera.

The hyper-stabilization engine (170) performs various operation/determines various parameters, using equation-1 to equation-6, to generate the hyper-stabilized video, where parameters of the hyper-stabilized video are given in Table 1 below.

TABLE 1

| Parameters | Output |
| --- | --- |
| Field of View (FoV) Field width | Camera-1 - 64 MP telephoto camera: 0.53 × 0.71 radians<br>Camera-2 - 12 MP ultra-wide camera: 0.6 × 1.06 radians<br>$a_1 = \min(0.53, 0.71) = 0.53$ radians<br>$a_2 = \min(0.6, 1.06) = 0.6$ radians |
| CSFoV | $s_m = \dfrac{\max(a_1, a_2)}{\sqrt{2}} = \dfrac{\max(0.53, 0.6)}{\sqrt{2}} = \dfrac{0.6}{\sqrt{2}} = 0.42$ radians |

TABLE 1-continued

| Parameters | Output |
|---|---|
| First camera selector | $a_1 > s_m$, $a_m = a_1$, and the first camera choice is camera-1 |
| Maximum rotation angle ($t_i$) | $t_1 = \sin^{-1}\dfrac{a_1 - \sqrt{2s_m^2 - a_1^2}}{2s_m} = 0.32$ radians = 18 degrees |
| Optimal resolution | $E_1 = \min(H, V) \times \dfrac{s_m}{a_1} = 4 \times 4 = 16$ MP square is extracted from the center of the frame |
| | $E_2 = \min(H, V) \times \dfrac{s_m}{a_2} = 1.8 \times 1.8 = 3.2$ MP square is extracted from the center of the frame |

The hyper-stabilization engine (170) automatically switches between the first camera sensor (150a) and the second camera sensor (150b). For example, the first camera sensor (150a) records the video when the camera shake angle/maximum rotation angle ($t_i$) is less than or equal to the 18 degrees and the second camera sensor (150b) records the video when the camera shake angle/maximum rotation angle ($t_i$) is greater than 18 degrees. The hyper-stabilization engine (170) then selects the optimal resolution for each camera (150) based on the field width, the CSFoV, and the FoV.

User interface screen 403 represents a method in which an electronic device records the video where the video includes a narrow FoV (i.e. waste of sensor space) and a lower resolution for any camera shake angle. The electronic device corresponding to user interface screen 403 does not optimize the multiple camera sensors for various camera shake angles/maximum rotation angles ($t_i$)/current rotation angle.

As shown in user interface screen 404 and user interface screen 405, consider an example scenario where the user of the electronic device (100) wants to capture the hyper-stabilized video by selecting a hyper-stabilized mode (404a) of the electronic device (100) and utilizing a current camera configuration (e.g. dual camera) of the electronic device (100). The electronic device (100) has a dual camera with the first camera sensor (150a) being a 12 MP main camera and the second camera sensor (150b) being a 12 MP ultra-wide camera.

The hyper-stabilization engine (170) performs various operation/determines various parameters using equation-1 to equation-6 to generate the hyper-stabilized video, where parameters of the hyper-stabilized video are given in Table 2 below.

TABLE 2

| Parameters | Output |
|---|---|
| Field of View (FoV) | Camera-1 - 12 MP telephoto camera: 0.53 × 0.71 radians<br>Camera-2 - 12 MP ultra-wide camera: 0.6 × 1.06 radians |
| Field width | $a_1 = \min(0.53, 0.71) = 0.53$ radians<br>$a_2 = \min(0.6, 1.06) = 0.6$ radians |
| CSFoV | $s_m = \dfrac{\max(a_1, a_2)}{\sqrt{2}} = \dfrac{\max(0.53, 0.6)}{\sqrt{2}} = \dfrac{0.6}{\sqrt{2}} = 0.42$ radians |
| First camera selector | $a_1 > s_m$, $a_m = a_1$, and the first camera choice is camera-1 |
| Maximum rotation angle ($t_i$) | $t_1 = \sin^{-1}\dfrac{a_1 - \sqrt{2s_m^2 - a_1^2}}{2s_m} = 0.32$ radians = 18 degrees |
| Optimal resolution | $E_1 = \min(H, V) \times \dfrac{s_m}{a_1} = 2.4 \times 2.4 = 5.8$ MP square is extracted from the center of the frame |
| | $E_2 = \min(H, V) \times \dfrac{s_m}{a_2} = 1.8 \times 1.8 = 3.2$ MP square is extracted from the center of the frame |

The hyper-stabilization engine (170) automatically switches between the first camera (150a) and the second camera (150b). For example, the first camera (150a) records the video when the camera shake angle/maximum rotation angle ($t_i$) is less than or equal to the 18 degrees and the second camera (150b) records the video when the camera shake angle/maximum rotation angle ($t_i$) is greater than 18 degrees. The hyper-stabilization engine (170) then selects the optimal resolution for each camera (150) based on the field width, the CSFoV, and the FoV.

User interface screen 406, represents a method in which an electronic device records the video where the video includes the narrow FoV (i.e. waste of sensor space) and the lower resolution for any camera shake angle. The electronic device corresponding to user interface screen 406 does not optimize the multiple camera sensors for various camera shake angles/maximum rotation angles ($t_i$)/current rotation angle.

Figure 5:
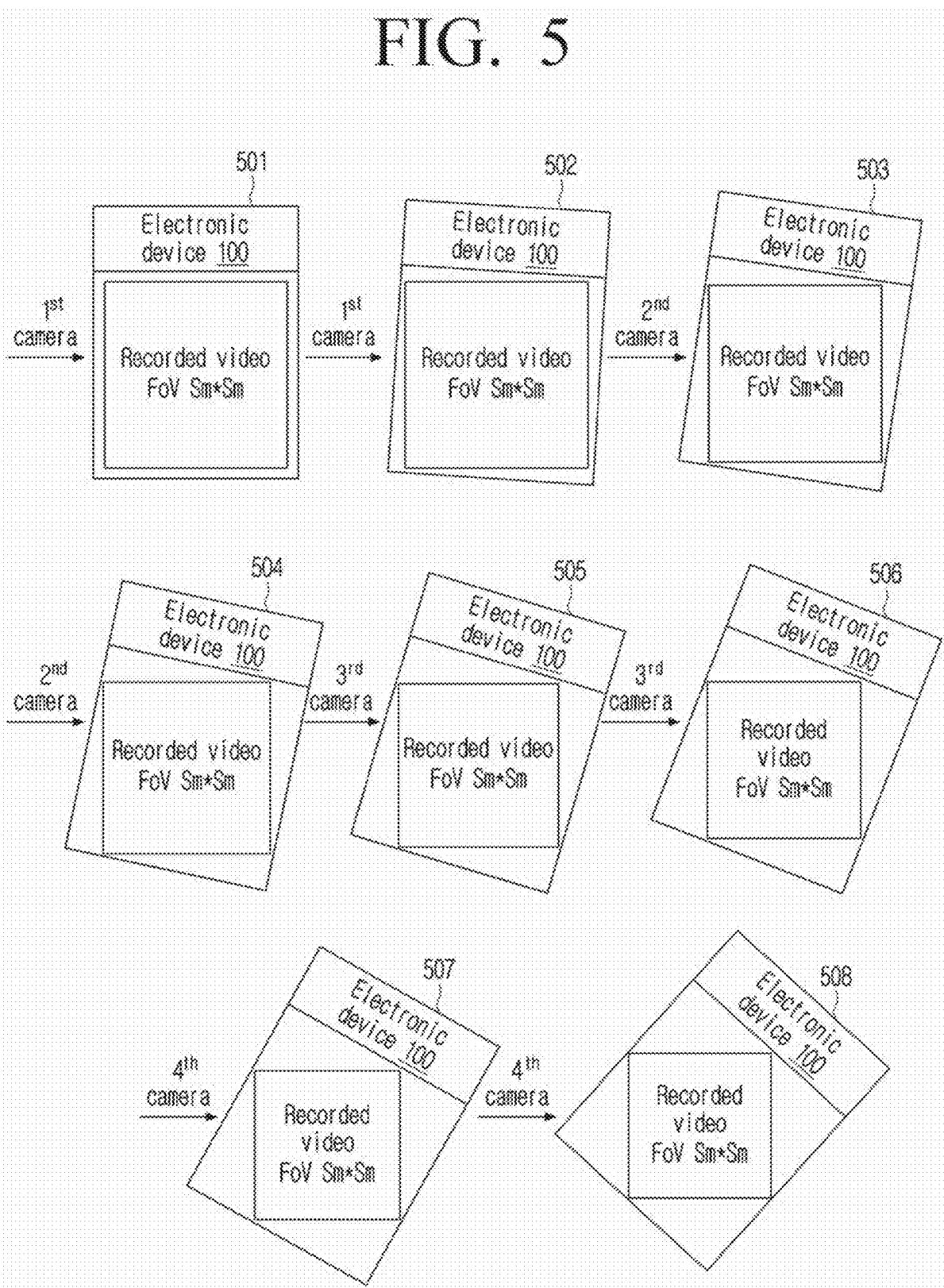
FIG. 5 is a diagram illustrating an example scenario relating to the automatic switching between multiple camera sensors based on the maximum rotation angle and the current rotation angle in order to continue capturing the image frame(s), according to an embodiment.

FIG. 5 is another example scenario illustrating the automatic switch between the multiple cameras (150a-150n) (e.g. four-camera) based on the maximum rotation angle and the current rotation angle in order to continue capturing the image frame(s), according to an embodiment as disclosed herein.

At step 501 and step 502, the hyper-stabilization engine (170) selects the first camera sensor (150a) which has the lowest field width among all cameras (150) which is greater than optimal CSFoV ($a_1 > s_m$, $a_m = a_1$) and captures the image frame(s) using the first camera (150a) until the current rotation angle of the electronic device (100) reaches to the maximum rotation angle ($t_1$), then automatically switches to the second camera (150b-150n) to continue capturing the image frame(s). At step 503 and step 504, the hyper-stabilization engine (170) selects the second camera (150b) which has second-lowest field width among all cameras (150) which is greater than optimal CSFoV ($a_2 > s_m$, $a_m = a_2$) and captures the image frame(s) using the second camera (150b) until the current rotation angle of the electronic device (100) reaches to the maximum rotation angle ($t_2$), then automatically switches to the third camera (150c) to continue capturing the image frame(s).

At step 505 and step 506, the hyper-stabilization engine (170) selects the third camera (150c) which has third-lowest field width among all cameras (150) which is greater than optimal CSFoV ($a_3 > s_m$, $a_m = a_3$) and captures the image frame(s) using the third camera (150c) until the current rotation angle of the electronic device (100) reaches to the maximum rotation angle ($t_3$), then automatically switches to the fourth camera (150d) to continue capturing the image frame(s). At step 507 and step 508, the hyper-stabilization engine (170) selects the fourth camera (150d) which has the fourth-lowest field width among all cameras (150) which is greater than optimal CSFoV ($a_4 > s_m$, $a_m = a_4$) and captures the image frame(s) using the fourth camera (150d) until the current rotation angle of the electronic device (100) reaches to the maximum rotation angle ($t_4$) or any rotation grater then maximum rotation angle ($t_4$).

Embodiments disclosed herein can be implemented using at least one hardware device and performing network management functions to control the elements.

The foregoing description of the specific embodiments will so fully reveal the general nature of embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while embodiments herein have been variously described, those skilled in the art will recognize that embodiments herein can be practiced with modification within the scope of the disclosure.

What is claimed is:

1. A method for generating a hyper-stabilized video by an electronic device, the method comprising:
    detecting, by the electronic device, a preview of at least one image frame on a screen of the electronic device, wherein the at least one image frame is captured by one or more cameras of the electronic device;
    determining, by the electronic device, an optimal Central Square Field of View (CSFoV) in the at least one image frame;
    determining, by the electronic device, a maximum rotation angle of the electronic device for each camera of the one or more cameras based on the optimal CSFoV;
    determining, by the electronic device, a current rotation angle of the electronic device by using at least one sensor of the electronic device; and
    generating, by the electronic device, the hyper-stabilized video based on the maximum rotation angle of the electronic device for the each camera and the current rotation angle of the electronic device.

2. The method as claimed in claim 1, wherein the generating of the hyper-stabilized video based on the maximum rotation angle of the electronic device for the each camera and the current rotation angle of the electronic device comprises:
    capturing, by the electronic device, the at least one image frame using a first camera of the one or more cameras;
    automatically switching, by the electronic device, between the first camera and at least one second camera or among the at least one second camera based on the maximum rotation angle of the electronic device for the each camera and the current rotation angle in order to continue capturing the at least one image frame; and
    generating, by the electronic device, the hyper-stabilized video with an optimal resolution, wherein the hyper-stabilized video comprises the at least one image frame captured by the first camera and the at least one second camera.

3. The method as claimed in claim 1, wherein the determining of the optimal CSFoV in the at least one image frame comprises:
    receiving, by the electronic device, a plurality of camera sensor parameters from the each camera, wherein the plurality of camera sensor parameters comprises a horizontal size, a vertical size, a focal length, a horizontal Field of View (FoV), and a vertical FoV;
    determining, by the electronic device, a FoV of the each camera based on the plurality of camera sensor parameters;
    determining, by the electronic device, a field width of the each camera, wherein the field width comprises a minimum dimension of the FoV;
    sorting, by the electronic device, the field width from a lowest value to a highest value;
    storing, by the electronic device, the sorted field width in an array; and
    selecting, by the electronic device, the optimal CSFoV in the at least one detected image frame, wherein the optimal CSFoV comprises the field width having the highest value from among all of the one or more cameras.

4. The method as claimed in claim 1, wherein the optimal CSFoV of the electronic device is determined based on at least one of a highest field width among all of the one or more cameras, a user input, and a history of the user input.

5. The method as claimed in claim 1, wherein the determining of the maximum rotation angle of the electronic device for the each camera based on the optimal CSFoV comprises:
  determining, by the electronic device, the maximum rotation angle of the electronic device for the each camera based on the optimal CSFoV and a field width of the each camera;
  sorting, by the electronic device, the determined maximum rotation angle from a lowest value to a highest value; and
  storing, by the electronic device, the sorted maximum rotation angle in an array.

6. The method as claimed in claim 1, wherein the at least one sensor of the electronic device comprises at least one from among a gyroscope, an accelerometer, a tilt detector, a step detector, and a magnetometer.

7. The method as claimed in claim 1, wherein the current rotation angle is used to select an optimal camera by using the at least one sensor to correct a frame rotation and extract the optimal CSFoV from the at least one image frame, and
  wherein the optimal camera comprises at least one of a first camera and at least one second camera.

8. The method as claimed in claim 2, wherein the capturing of the at least one image frame using the first camera of the electronic device comprises:
  selecting, by the electronic device, the first camera, wherein the first camera comprises a lowest field width among all of the one or more cameras which is greater than the optimal CSFoV; and
  capturing, by the electronic device, the at least one image frame using the first camera of the electronic device.

9. The method as claimed in claim 2, wherein the automatically switching between the first camera and at least one second camera or among the at least one second camera based on the maximum rotation angle of the electronic device for the each camera and the current rotation angle comprises:
  determining, by the electronic device, whether the current rotation angle exceeds the maximum rotation angle;
  switching to an optimal camera, wherein the optimal camera comprises a next larger field width corresponding to a next larger maximum rotation angle based on determining that the current rotation angle exceeds the maximum rotation angle, and wherein the optimal camera comprises a next smaller field width corresponding to a next smaller maximum rotation angle based on determining that the current rotation angle does not exceed the maximum rotation angle; and
  capturing, by the electronic device, the at least one image frame using the optimal camera,
  wherein the optimal camera comprises at least one of the first camera and the at least one second camera.

10. The method as claimed in claim 1, further comprising a smooth switching between a first camera and at least one second camera or among the at least one second camera.

11. The method as claimed in claim 10, wherein the smooth switching comprises:
  determining, by the electronic device, a buffer angle around the maximum rotation angle of the each camera;
  automatically switching on, by the electronic device, the at least one second camera based on the current rotation angle of the electronic device being greater than a difference between the maximum rotation angle and the buffer angle of the first camera;
  simultaneously switching on, by the electronic device, the first camera and the at least one second camera when the current rotation angle of the electronic device being lesser than a sum of the maximum rotation angle and the buffer angle of the first camera; and
  automatically switching off, by the electronic device, the first camera based on the current rotation angle of the electronic device being greater than the sum of the maximum rotation angle and the buffer angle of the first camera.

12. An electronic device for generating a hyper-stabilized video, the electronic device comprising:
  a memory;
  at least one processor processor;
  a camera; and
  a hyper-stabilization engine, operably connected to the memory and the processor, and configured to:
    detect a preview of at least one image frame on a screen of the electronic device, wherein the at least one image frame is captured by one or more cameras of the electronic device;
    determine an optimal Central Square Field of View (CSFoV) in the at least one detected image frame;
    determine a maximum rotation angle of the electronic device for each camera of the one or more cameras based on the optimal CSFoV;
    determine a current rotation angle of the electronic device by using at least one sensor of the electronic device; and
    generate the hyper-stabilized video based on the maximum rotation angle of the electronic device for the each camera and the current rotation angle of the electronic device.

13. The electronic device as claimed in claim 12, wherein to generate the hyper-stabilized video based on the maximum rotation angle of the electronic device for each camera and the current rotation angle of the electronic device the hyper-stabilization engine is further configured to:
  capture the at least one image frame using a first camera of the one or more cameras;
  automatically switch between the first camera and at least one second camera or among the at least one second camera based on the maximum rotation angle and the current rotation angle in order to continue capturing the at least one image frame; and
  generate the hyper-stabilized video with an optimal resolution, wherein hyper-stabilized video comprises the at least one image frame captured by the first camera and the at least one second camera.

14. The electronic device as claimed in claim 12, wherein to determine the optimal CSFoV in the at least one detected image frame, the hyper-stabilization engine is further configured to:
  receive a plurality of camera sensor parameters from the each camera, wherein the plurality of camera sensor parameters comprises a horizontal size, a vertical size, a focal length, a horizontal Field of View (FoV), and a vertical FoV;
  determine a FoV of the each camera based on the received plurality of camera sensor parameters;
  determine a field width of each camera, wherein the field width comprises a minimum dimension of the FoV;

sort the field width from a lowest value to a highest value;
store the sorted field width in an array; and
select the optimal CSFoV in the at least one detected image frame, wherein the optimal CSFoV comprises the field width having the highest value from among all of the one or more cameras.

15. The electronic device as claimed in claim 12, wherein the optimal CSFoV of the electronic device is determined based on at least one of a highest field width among all of the one or more cameras, a user input, and a history of the user input.

* * * * *